(12) United States Patent
Davydov et al.

(10) Patent No.: US 12,040,999 B2
(45) Date of Patent: Jul. 16, 2024

(54) SOUNDING REFERENCE SIGNAL (SRS) TRANSMISSION FRAMEWORK

(71) Applicant: APPLE INC., Cupertino, CA (US)

(72) Inventors: Alexei Davydov, Nizhny Novgorod (RU); Sameer Pawar, Santa Clara, CA (US); Avik Sengupta, San Jose, CA (US)

(73) Assignee: APPLE INC., Cupertino, CA (US)

( * ) Notice: Subject to any disclaimer, the term of this patent is extended or adjusted under 35 U.S.C. 154(b) by 674 days.

(21) Appl. No.: 17/265,168

(22) PCT Filed: Aug. 9, 2019

(86) PCT No.: PCT/US2019/045998
§ 371 (c)(1),
(2) Date: Feb. 1, 2021

(87) PCT Pub. No.: WO2020/033888
PCT Pub. Date: Feb. 13, 2020

(65) Prior Publication Data
US 2021/0328739 A1 Oct. 21, 2021

Related U.S. Application Data

(60) Provisional application No. 62/717,716, filed on Aug. 10, 2018.

(51) Int. Cl.
*H04L 5/00* (2006.01)
*H04W 72/0446* (2023.01)
*H04W 72/542* (2023.01)

(52) U.S. Cl.
CPC ....... *H04L 5/0048* (2013.01); *H04W 72/0446* (2013.01); *H04W 72/542* (2023.01)

(58) Field of Classification Search
CPC ..... H04L 27/261; H04L 5/0007; H04L 5/001; H04L 5/0012; H04L 5/0048; H04L 5/13; H04W 72/0446; H04W 72/542
See application file for complete search history.

(56) References Cited

U.S. PATENT DOCUMENTS

| | | | |
|---|---|---|---|
| 2003/0093641 A1* | 5/2003 | Kahn | G06F 9/30101 711/170 |
| 2009/0060004 A1* | 3/2009 | Papasakellariou | H04L 5/0042 375/140 |

(Continued)

FOREIGN PATENT DOCUMENTS

| | | |
|---|---|---|
| CN | 102771171 A | 11/2012 |
| CN | 106233658 A | 12/2016 |

(Continued)

OTHER PUBLICATIONS

Huawei, et al., "New WI proposal: DL MIMO efficiency enhancements for LTE", RP-181485, 3GPP TSG RAN Meeting #80, La Jolla, California, Agenda Item 10.1.2 ,Jun. 11-14, 2018 ,4 pages.

(Continued)

*Primary Examiner* — Stephen J Clawson
(74) *Attorney, Agent, or Firm* — Dorsey & Whitney LLP

(57) ABSTRACT

Technology for an eNodeB operable to decode a sounding reference signal (SRS) received from a user equipment (UE) is disclosed. The eNodeB can decode the SRS received from the UE, wherein 5 the SRS is received using one or more SRS resources in a subframe where each SRS resource includes one or more symbols. The subframe can be an uplink subframe dedicated for SRS transmission or a short transmission time interval (sTTI) subframe used for SRS transmission. The eNodeB can determine uplink channel quality information for a channel between the eNodeB and the UE based in part on the 10 SRS.

16 Claims, 12 Drawing Sheets

(56) References Cited

U.S. PATENT DOCUMENTS

| | | | | |
|---|---|---|---|---|
| 2009/0238241 A1* | 9/2009 | Hooli | .................... | H04L 5/0012 |
| | | | | 375/E1.033 |
| 2010/0246561 A1* | 9/2010 | Shin | .................... | H04B 7/0691 |
| | | | | 375/267 |
| 2011/0032888 A1* | 2/2011 | Matsumoto | ............. | H04L 5/001 |
| | | | | 370/329 |
| 2011/0274063 A1* | 11/2011 | Li | ......................... | H04W 84/12 |
| | | | | 370/329 |
| 2013/0315195 A1* | 11/2013 | Ko | ........................ | H04L 5/0051 |
| | | | | 370/329 |
| 2017/0318487 A1* | 11/2017 | Yamamoto | ........... | H04B 17/309 |
| 2017/0374675 A1 | 12/2017 | Hwang et al. | | |
| 2018/0183552 A1* | 6/2018 | Hosseini | ............. | H04L 27/2613 |

FOREIGN PATENT DOCUMENTS

| | | |
|---|---|---|
| CN | 106506127 A | 3/2017 |
| TW | 201803302 A | 1/2018 |
| WO | 2017003962 A1 | 1/2017 |

OTHER PUBLICATIONS

Intel Corporation, et al., "Remaining issues on SRS", R1-1806513, 3GPP TSG RAN WG1 Meeting #93, Busan, South Korea. Agenda Item 7.1.2.3.5 , May 21-25, 2018 ,3 pages.

PCT/US2019/045998,, International Search Report and Written Opinion, Nov. 29, 2019, 8 pages.

ZTE, et al., "Remaining issues on SRS, R1-1805834", 3GPP TSG RAN WG1 Meeting #93, Busan, Korea, Agenda Item 7.1.2.3.5, May 21-25, 2018, 5 pages.

\* cited by examiner

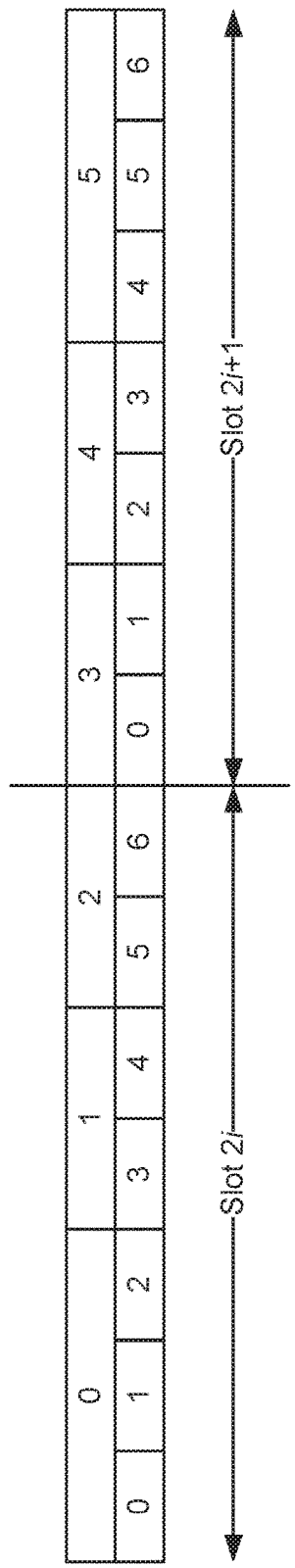
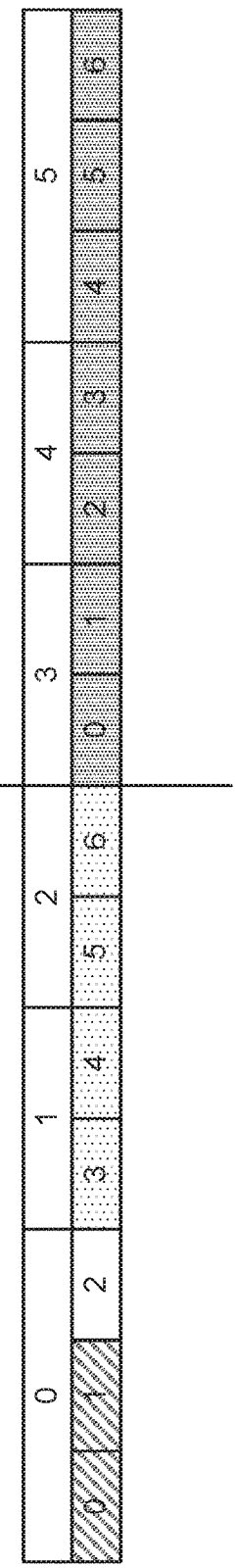
FIG. 4
FIG. 5

SOUNDING REFERENCE SIGNAL (SRS) TRANSMISSION FRAMEWORK

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 4 is a table of single-carrier frequency-division multiple access (SC-FDMA) symbols in different subslots of a subframe in accordance with an example;

FIG. 5 illustrates a short transmission time interval (TTI) structured uplink subframe for an SRS transmission in accordance with an example;

Figure 1:
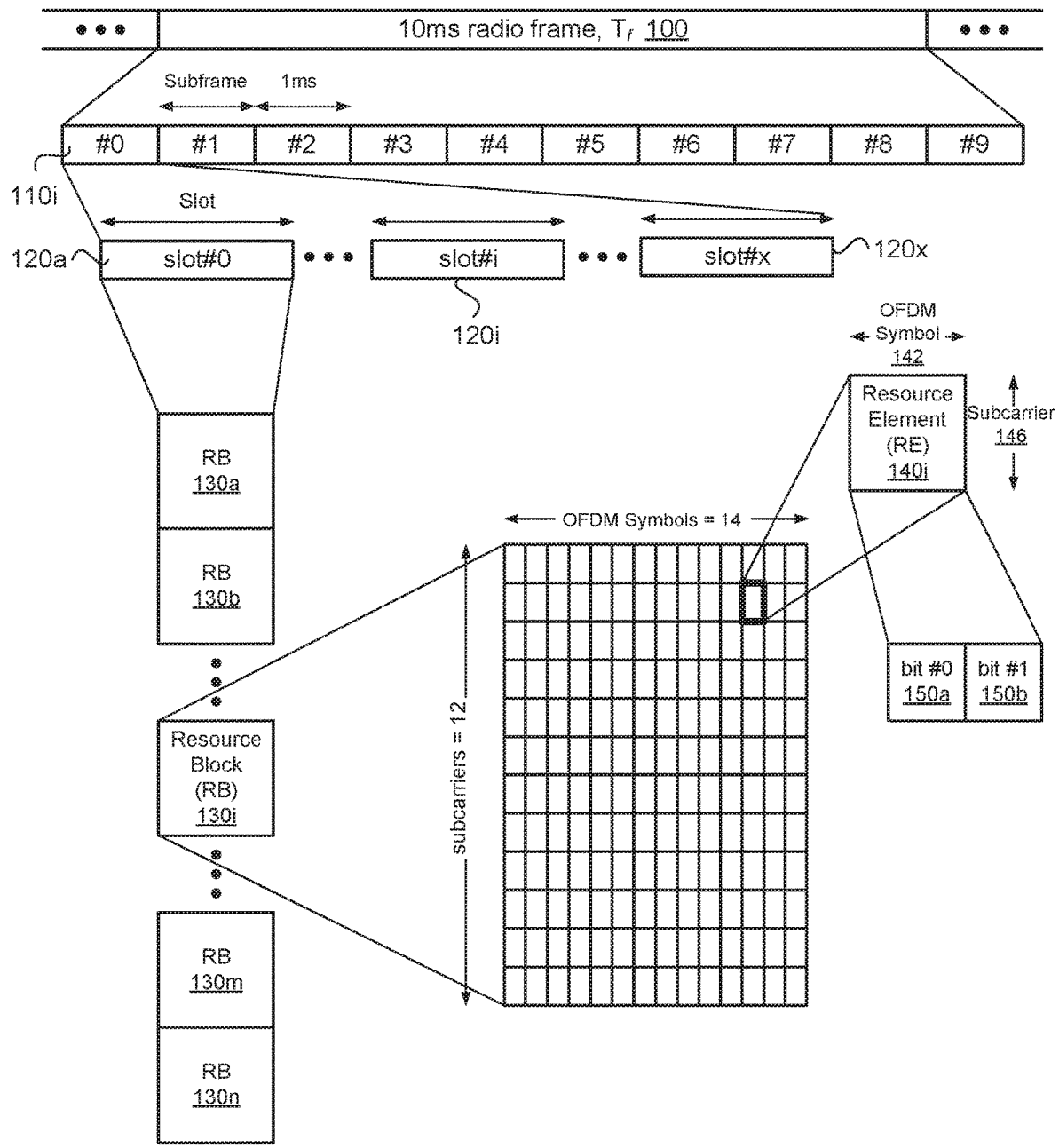
FIG. 1 illustrates a block diagram of a Third-Generation Partnership Project (3GPP) frame structure in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Definitions

As used herein, the term "User Equipment (UE)" refers to a computing device capable of wireless digital communication such as a smart phone, a tablet computing device, a laptop computer, a multimedia device such as an iPod Touch®, or other type computing device that provides text or voice communication. The term "User Equipment (UE)" may also be referred to as a "mobile device," "wireless device," of "wireless mobile device."

As used herein, the term "Base Station (BS)" includes "Base Transceiver Stations (BTS)," "NodeBs," "evolved NodeBs (eNodeB or eNB)," "New Radio Base Stations (NR BS) and/or "next generation NodeBs (gNodeB or gNB)," and refers to a device or configured node of a mobile phone network that communicates wirelessly with UEs.

As used herein, the term "cellular telephone network," "4G cellular," "Long Term Evolved (LTE)," "5G cellular" and/or "New Radio (NR)" refers to wireless broadband technology developed by the Third Generation Partnership Project (3GPP).

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 provides an example of a 3GPP frame structure. In particular, FIG. 1 illustrates a downlink radio frame structure. In the example, a radio frame 100 of a signal used to transmit the data can be configured to have a duration, $T_f$, of 10 milliseconds (ms). Each radio frame can be segmented or divided into ten subframes $110i$ that are each 1 ms long. Each subframe can be further subdivided into one or multiple slots $120a$, $120i$, and $120x$, each with a duration, $T_{slot}$, of $1/\mu$ ms, where $\mu=1$ for 15 kHz subcarrier spacing, $\mu=2$ for 30 kHz, $\mu=4$ for 60 kHz, $\mu=8$ for 120 kHz, and u=16 for 240 kHz. Each slot can include a physical downlink control channel (PDCCH) and/or a physical downlink shared channel (PDSCH).

Each slot for a component carrier (CC) used by the node and the wireless device can include multiple resource blocks (RBs) $130a$, $130b$, $130i$, $130m$, and $130n$ based on the CC frequency bandwidth. The CC can have a carrier frequency having a bandwidth. Each slot of the CC can include downlink control information (DCI) found in the PDCCH. The PDCCH is transmitted in control channel resource set (CORESET) which can include one, two or three Orthogonal Frequency Division Multiplexing (OFDM) symbols and multiple RBs.

Each RB (physical RB or PRB) can include 12 subcarriers (on the frequency axis) and 14 orthogonal frequency-division multiplexing (OFDM) symbols (on the time axis) per slot. The RB can use 14 OFDM symbols if a short or normal cyclic prefix is employed. The RB can use 12 OFDM symbols if an extended cyclic prefix is used. The resource block can be mapped to 168 resource elements (REs) using short or normal cyclic prefixing, or the resource block can be mapped to 144 REs (not shown) using extended cyclic prefixing. The RE can be a unit of one OFDM symbol 142 by one subcarrier (i.e., 15 kHz, 30 kHz, 60 kHz, 120 kHz, and 240 kHz) 146.

Each RE 140i can transmit two bits 150a and 150b of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

In one configuration, in an LTE system, a sounding reference signal (SRS) is a reference signal transmitted by a UE in an uplink (UL) direction, and the SRS can be used by a base station to estimate an uplink channel quality over a wider bandwidth. The base station may use the uplink channel quality for uplink frequency selective scheduling. In addition, the base station can use the SRS for uplink timing estimation as part of a timing alignment procedure. For example, the base station can use the SRS when no physical uplink shared channel (PUSCH) or physical uplink control channel (PUCCH) transmissions occur in the uplink for an extended period of time, in which case the base station can rely on the SRS for the uplink timing estimation.

In LTE systems, the SRS has been helpful in improving network performance by enabling uplink frequency selective scheduling via estimation of the uplink channel quality over the wider bandwidth. Additionally, the SRS has contributed to performance improvements for downlink (DL) multiple-input and multiple-output (MIMO), especially for massive MIMO in time division duplex (TDD) systems. Specifically, in LTE Release-15 TDD systems, an SRS coverage enhancement can be achieved using special subframes. However, the use of only special subframes for the SRS coverage enhancement can be restrictive in terms of the number of supportable UEs that necessitate the SRS coverage enhancement. In addition, there is no special subframe SRS coverage enhancement for frequency division duplex (FDD) systems.

As described herein, various design options can be used for increasing SRS coverage and capacity, thereby achieving increased network performance for both UL and DL MIMO. More specifically, two design/framework options are described herein for increasing the SRS coverage and capacity for normal UL subframes. In a first option, all symbols in a normal UL subframe can be reserved for the SRS transmission, with a possibility of multiplexing UL control channel if desired. In a second alternative, a short transmission time interval (TTI) sub-slot based UL frame structure can be utilized to more efficiently increase the SRS coverage, while being able to use a subset of sub-slots in an UL subframe for data transmission.

In one example, the SRS coverage and SRS capacity can be increased, thereby achieving increased network performance for both UL and DL MIMO. For example, the SRS coverage can be increased by repeating an SRS transmission over multiple adjacent symbols, thus improving a processing gain at a base station. In another example, the SRS capacity can be increased by increasing types of UL subframes that can be used for the SRS transmission, as well as by increasing a number of SRS resources within a subframe.

In one example, in LTE Release-15, an SRS resource is limited to one symbol resource transmitted as a last symbol of a normal UL subframe, or to more than one symbol in a special sub-frame. However, the frequency of occurrence for special subframes can be a limitation when using special subframes for SRS. Thus, to increase SRS opportunities as well as to provide SRS resources with more than one symbol, a dedicated UL subframe can be used for an SRS transmission or a short TTI (sTTI) UL subframe can be used for the SRS transmission, as described in further detail below.

In one example, with respect to the dedicated UL subframe for the SRS, designing SRS resources with more than one symbol transmission can be important, so as to utilize additional symbols for transmission with repetition to increase the coverage. Thus, one design is to dedicate a complete UL subframe for SRS, which can provide two benefits. First, this design provides flexibility of designing SRS resources with multiple symbols N, where N can take any value between 1 and 7. Second, this design design can be transparent to legacy Release-15 UE's.

Figure 2:
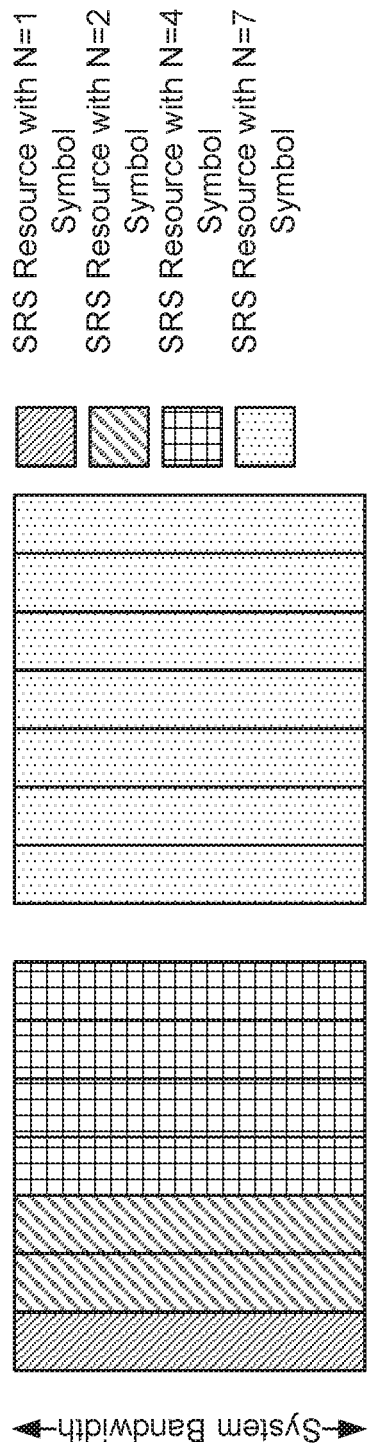
FIG. 2 illustrates a dedicated normal uplink subframe for a sounding reference signal (SRS) transmission in accordance with an example.

FIG. 2 illustrates an example of a dedicated normal uplink subframe for an SRS transmission. In this example, 4 SRS resources can be included within the subframe. In this example, the SRS resources can have N=1, 2, 4, and 7 symbols. In addition, a specific location of the symbols can be flexible, as long as a single resource is not spanning multiple slots.

Figure 3:
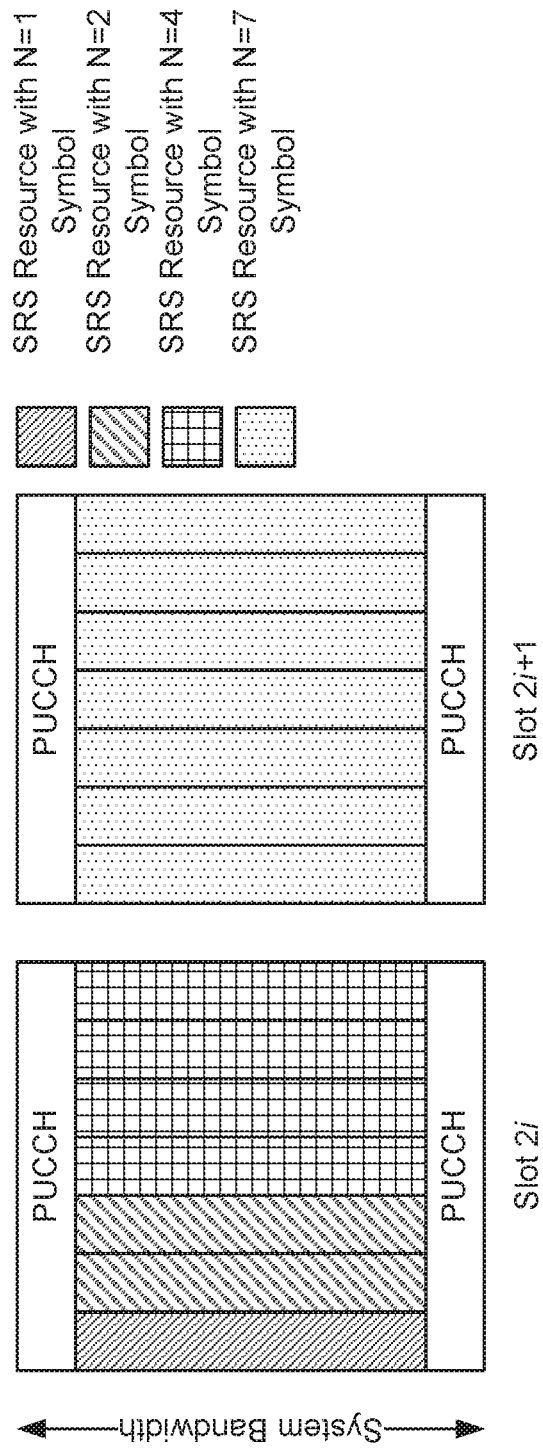
FIG. 3 illustrates a dedicated normal uplink subframe for a sounding reference signal (SRS) transmission with additional multiplexing of a physical uplink control channel (PUCCH) at an edge of a system bandwidth (BW) in accordance with an example.

FIG. 3 illustrates another example of a dedicated normal uplink subframe for an SRS transmission. In this example, 4 SRS resources can be included within the subframe, and the SRS resources can have N=1, 2, 4, and 7 symbols. In addition, in this example, a physical uplink control channel (PUCCH) can be multiplexed at an edge of a system bandwidth.

In one example, with respect to the sTTI uplink subframe for the SRS transmission, in LTE Release-15, short TTI transmissions are supported for latency reduction.

FIG. 4 is an example of a table of single-carrier frequency-division multiple access (SC-FDMA) symbols in different sub-slots of a subframe i. For example, for a sub-slot number (e.g., 0, 1, 2, 3, 4, 5), a slot number (2i or 2i+1) and an uplink slot pattern can be defined. This sub-slot configuration can be applicable for frame structure type-1 used for FDD. For FDD, 10 subframes, 20 slots, or up to 60 sub-slots can be available for uplink transmissions in each 10 ms interval.

In one example, each sub-slot or slot can be a TTI and can be configured to a UE for data transmission. This framework can be used to design enhanced support for SRS, where UL data or control channel transmission and one or more than one SRS resource can be scheduled in a subframe and each SRS resource can contain one or more symbols for possible repetition for coverage enhancement. In addition, this design can be flexible to accommodate SRS resources with multiple symbols N, where N can take any value between 1 and 7, and this design can be transparent to legacy Release-15 UE's.

FIG. 5 illustrates an example of a short TTI structured uplink subframe for an SRS transmission with increased coverage. In this example, 3 SRS resources with N=2, 4 and 7 symbols, respectively, can be included in the subframe. However, specific locations of the symbols can be flexible, as long as the symbols do not span across multiple slots. In addition, since each sub-slot can be a TTI, unused symbols within a sub-slot cannot be used for any other transmission. For example, as shown in FIG. 5, the symbol indexed 2 can be muted.

Figure 6:
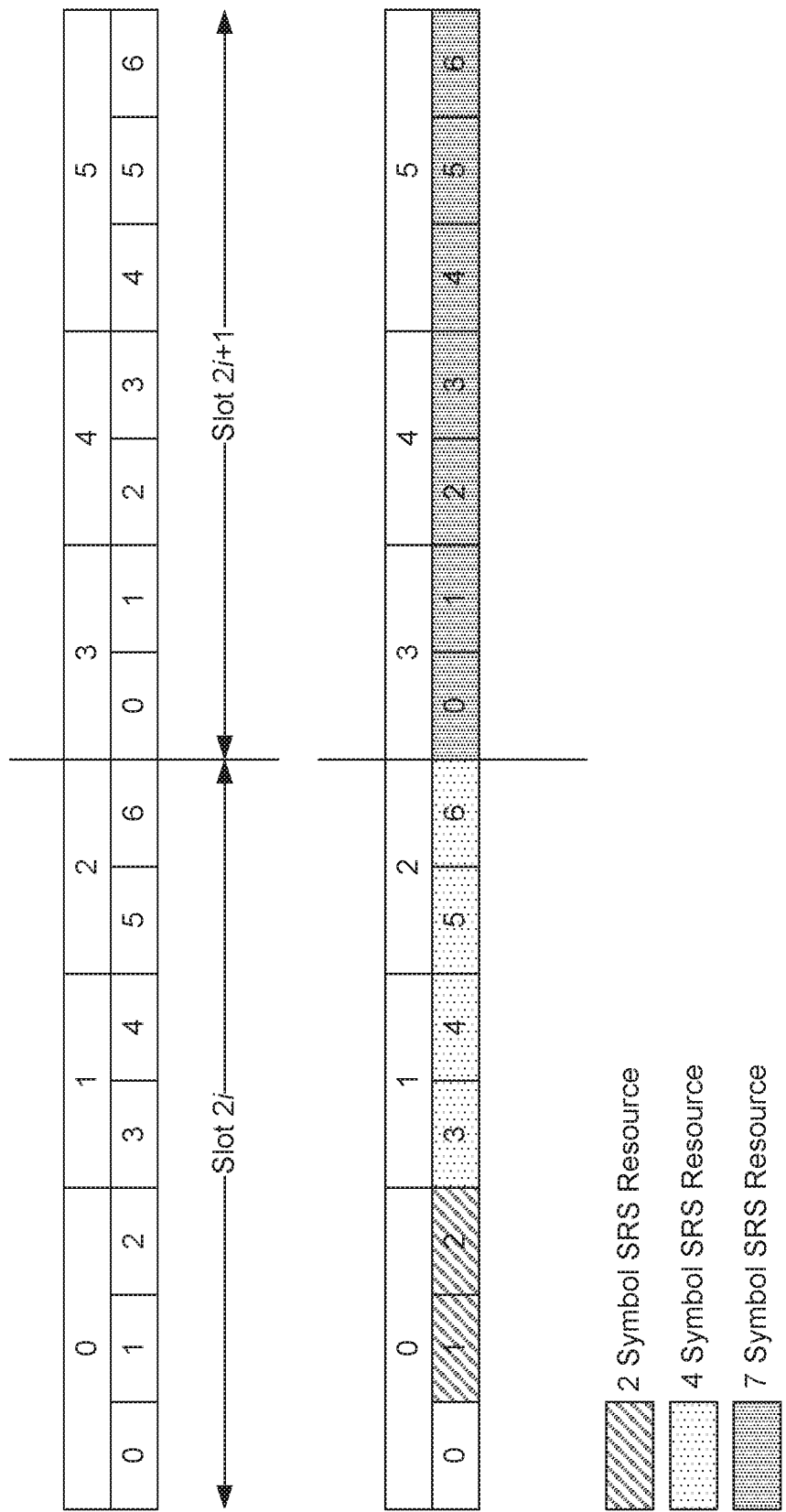
FIG. 6 illustrates a short TTI structured uplink subframe for an SRS transmission in accordance with an example.

FIG. 6 illustrates another example of a short TTI structured uplink subframe for an SRS transmission with increased coverage. In this example, 3 SRS resources with N=2, 4 and 7 symbols, respectively, can be included in the subframe. In addition, in this example, within a sub-slot actual, occupancy can be at either a beginning of the sub-slot or at an end of the sub-slot, as long as all the symbols within a resource are adjacent.

In one example, in order to support the coverage enhanced SRS transmission, in addition to the enhanced frame structure design described above, the design/definition of an SRS resource can be enhanced or modified. For example, an enhanced SRS resource can span N={1, 2, 4, 6, 7} adjacent symbols in a slot. A higher layer parameter R can specify a repetition factor used for the SRS resource. This factor R={1, 2, 4, 7}, R<=N and is a factor of N, equals to a number of symbols within a resource that transmit a repeated reference signal (RS), on a same set of sub-carriers, for coverage enhancement.

In one example, sequence and group hopping of the SRS transmission can use a symbol location within a radio frame, in addition to an RS-ID to implement sequence and group hopping. Further, in enhanced SRS, intra and inter slot frequency hopping can be supported for all periodic, semi-persistent SRS resources. Further, an enhanced aperiodic SRS resource can support intra-slot frequency hopping. In addition, in the case of inter-slot hopping, an SRS resource can use identical symbol locations for different hops.

In one configuration, a design for enabling channel measurements and channel state information (CSI) calculations at a base station can be defined. The design can include a configuration of an SRS resource for a UE transmission of an UL reference signal channel (SRS) from a UE, and reception and CSI estimation at the base station.

In one example, the UE can be configured with none, one or more aperiodic, periodic or semi-persistent SRS resources. In one example, the SRS resource can consist of N in {1, 2, 4, 6, 7} symbols per slot. In another example, a resource specific higher layer parameter R<=N that divides N, can specify a repetition factor for the SRS transmission. In yet another example, the SRS resource can be scheduled in a normal UL subframe or a short TTI subframe.

In one example, SRS resource symbol locations can be at flexible as long as all the symbols are adjacent and contained within a slot. In another example, unused symbols within a sub-slot containing SRS resource can be muted except when the unused symbol is a last symbol of a sub-frame. In yet another example, when a last symbol of the sub-frame is not used by an enhanced SRS resource, the last symbol can be scheduled for SRS transmission by a Release-15 UE.

In one example, the SRS resource can be multiplexed in a frequency domain with an UL control channel. In another example, intra-slot, inter-slot or a combination of intra and inter slot frequency hopping of SRS can be supported. In yet another example, only intra-slot frequency hopping can be supported for aperiodic SRS resource.

In one example, same sub-carriers can be sounded for R symbols in a resource. In another example, a frequency hopping formula can consider the repetition factor R. In yet another example, group hopping for SRS transmission(s) can be supported. Further, a group and sequence hopping formula can consider a symbol location within a radio frame as a deciding factor among other parameters to compute group and sequence hopping indices.

Figure 7:
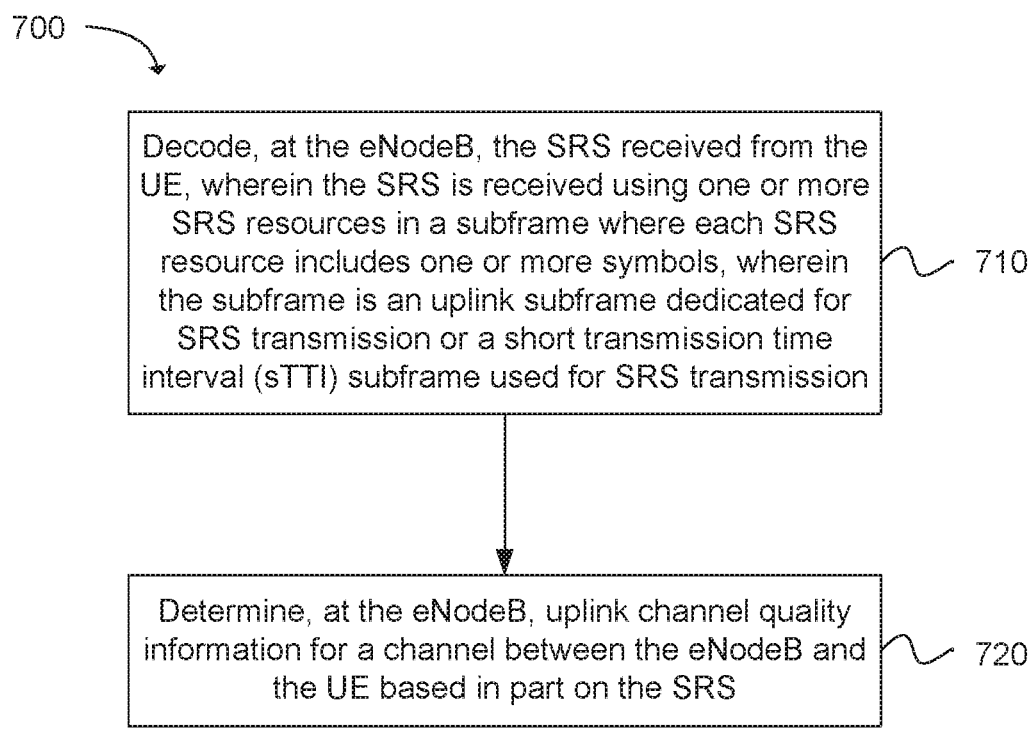
FIG. 7 depicts functionality of an eNodeB operable to decode a sounding reference signal (SRS) received from a user equipment (UE) in accordance with an example.

Another example provides functionality 700 of an eNodeB operable to decode a sounding reference signal (SRS) received from a user equipment (UE), as shown in FIG. 7. The eNodeB can comprise one or more processors configured to decode, at the eNodeB, the SRS received from the UE, wherein the SRS is received using one or more SRS resources in a subframe where each SRS resource includes one or more symbols, wherein the subframe is an uplink subframe dedicated for SRS transmission or a short transmission time interval (sTTI) subframe used for SRS transmission, as in block 710. The eNodeB can comprise one or more processors configured to determine, at the eNodeB, uplink channel quality information for a channel between the eNodeB and the UE based in part on the SRS, as in block 720. In addition, the eNodeB can comprise a memory interface configured to send to a memory the uplink channel quality information.

Figure 8:
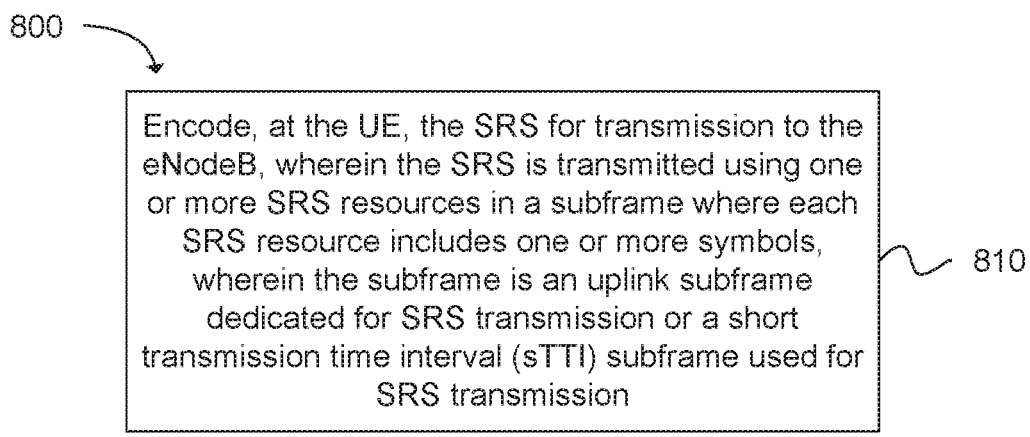
FIG. 8 depicts functionality of a user equipment (UE) operable to encode a sounding reference signal (SRS) for transmission to an eNodeB in accordance with an example.

Another example provides functionality 800 of a user equipment (UE) operable to encode a sounding reference signal (SRS) for transmission to an eNodeB, as shown in FIG. 8. The UE can comprise one or more processors configured to encode, at the UE, the SRS for transmission to the eNodeB, wherein the SRS is transmitted using one or more SRS resources in a subframe where each SRS resource includes one or more symbols, wherein the subframe is an uplink subframe dedicated for SRS transmission or a short transmission time interval (sTTI) subframe used for SRS transmission, as in block 810. In addition, the UE can comprise a memory interface configured to retrieve from a memory the SRS.

Figure 9:
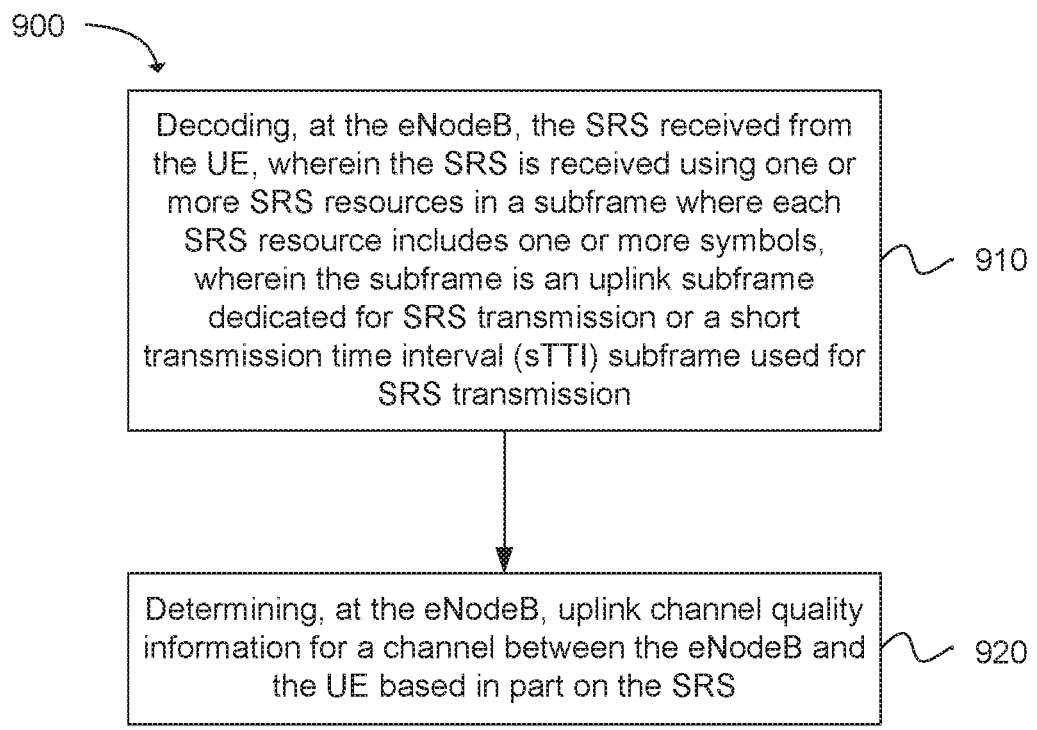
FIG. 9 depicts a flowchart of a machine readable storage medium having instructions embodied thereon for decoding a sounding reference signal (SRS) received from a user equipment (UE) in accordance with an example.

Another example provides at least one machine readable storage medium having instructions 900 embodied thereon for decoding a sounding reference signal (SRS) received from a user equipment (UE), as shown in FIG. 9. The instructions can be executed on a machine, where the instructions are included on at least one computer readable medium or one non-transitory machine readable storage medium. The instructions when executed by one or more processors of an eNodeB perform: decoding, at the eNodeB, the SRS received from the UE, wherein the SRS is received using one or more SRS resources in a subframe where each SRS resource includes one or more symbols, wherein the subframe is an uplink subframe dedicated for SRS transmission or a short transmission time interval (sTTI) subframe used for SRS transmission, as in block 910. The instructions when executed by one or more processors of the eNodeB perform: determining, at the eNodeB, uplink channel quality information for a channel between the eNodeB and the UE based in part on the SRS, as in block 920.

Figure 10:
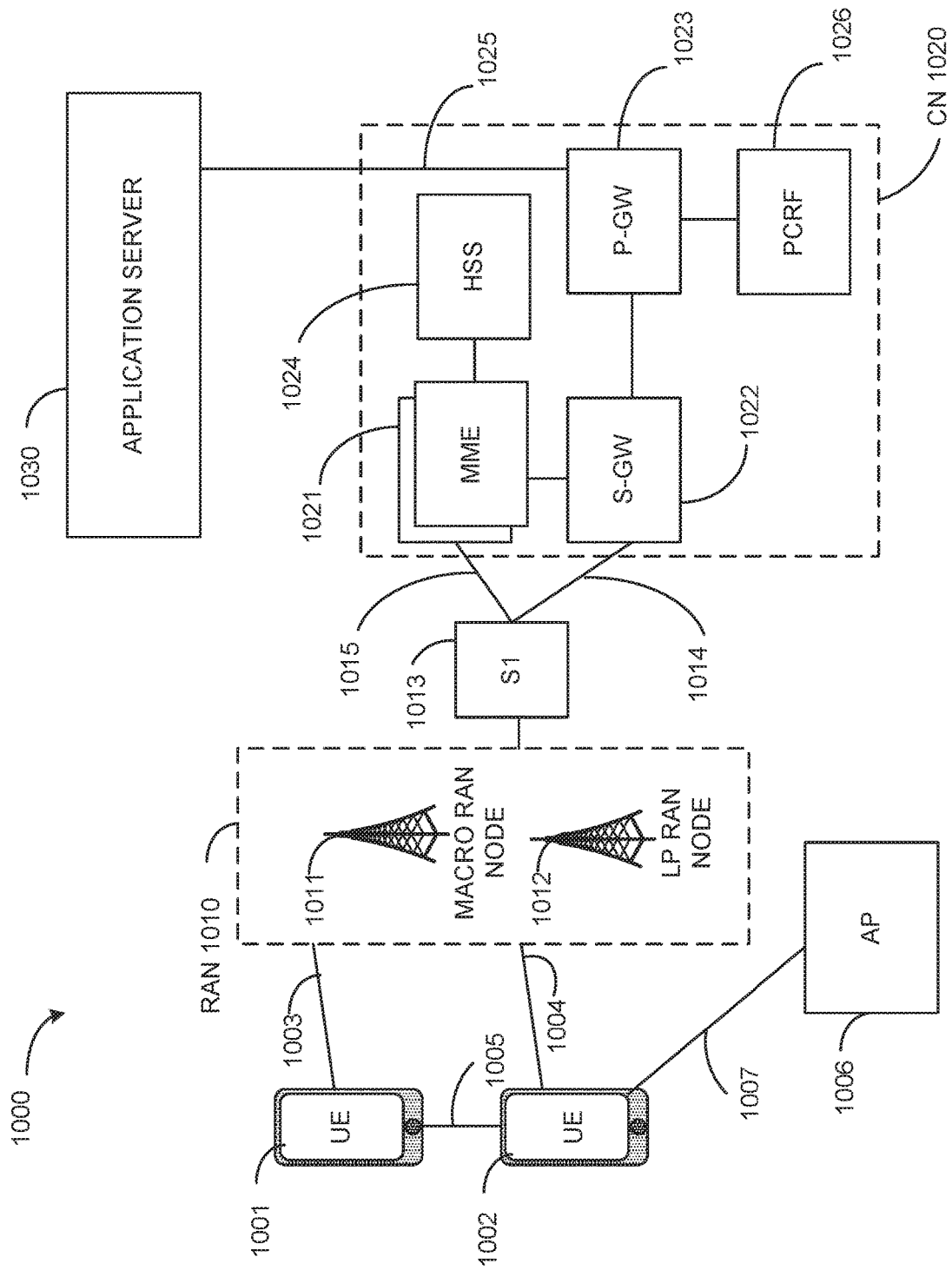
FIG. 10 illustrates an architecture of a wireless network in accordance with an example.

FIG. 10 illustrates an architecture of a system 1000 of a network in accordance with some embodiments. The system 1000 is shown to include a user equipment (UE) 1001 and a UE 1002. The UEs 1001 and 1002 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1001 and 1002 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1001 and 1002 may be configured to connect, e.g., communicatively couple, with a radio access network (RAN) 1010—the RAN 1010 may be, for example, an Evolved Universal Mobile Telecommunications System (UMTS) Terrestrial Radio Access Network (E-UTRAN), a NextGen RAN (NG RAN), or some other type of RAN. The UEs 1001 and 1002 utilize connections 1003 and 1004, respectively, each of which comprises a physical communications interface or layer (discussed in further detail below); in this example, the connections 1003 and 1004 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1001 and 1002 may further directly exchange communication data via a ProSe interface 1005. The ProSe interface 1005 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1002 is shown to be configured to access an access point (AP) 1006 via connection 1007. The connection 1007 can comprise a local wireless connection, such as a connection consistent with any IEEE 1102.15 protocol, wherein the AP 1006 would comprise a wireless fidelity (WiFi®) router. In this example, the AP 1006 is shown to be connected to the Internet without connecting to the core network of the wireless system (described in further detail below).

The RAN 1010 can include one or more access nodes that enable the connections 1003 and 1004. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1010 may include one or more RAN nodes for providing macrocells, e.g., macro RAN node 1011, and one or more RAN nodes for providing femtocells or picocells (e.g., cells having smaller coverage areas, smaller user capacity, or higher bandwidth compared to macrocells), e.g., low power (LP) RAN node 1012.

Any of the RAN nodes 1011 and 1012 can terminate the air interface protocol and can be the first point of contact for the UEs 1001 and 1002. In some embodiments, any of the RAN nodes 1011 and 1012 can fulfill various logical functions for the RAN 1010 including, but not limited to, radio network controller (RNC) functions such as radio bearer management, uplink and downlink dynamic radio resource management and data packet scheduling, and mobility management.

In accordance with some embodiments, the UEs 1001 and 1002 can be configured to communicate using Orthogonal Frequency-Division Multiplexing (OFDM) communication signals with each other or with any of the RAN nodes 1011 and 1012 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1011 and 1012 to the UEs 1001 and 1002, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1001 and 1002. The physical downlink control channel (PDCCH) may carry information about the transport format and resource allocations related to the PDSCH channel, among other things. It may also inform the UEs 1001 and 1002 about the transport format, resource allocation, and H-ARQ (Hybrid Automatic Repeat Request) information related to the uplink shared channel. Typically, downlink scheduling (assigning control and shared channel resource blocks to the UE 1002 within a cell) may be performed at any of the RAN nodes 1011 and 1012 based on channel quality information fed back from any of the UEs 1001 and 1002. The downlink resource assignment information may be sent on the PDCCH used for (e.g., assigned to) each of the UEs 1001 and 1002.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 11).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1010 is shown to be communicatively coupled to a core network (CN) 1020—via an S1 interface 1013. In embodiments, the CN 1020 may be an evolved packet core (EPC) network, a NextGen Packet Core (NPC) network, or some other type of CN. In this embodiment the S1 interface 1013 is split into two parts: the S1-U interface 1014, which carries traffic data between the RAN nodes 1011 and 1012 and the serving gateway (S-GW) 1022, and the S1-mobility management entity (MME) interface 1015, which is a signaling interface between the RAN nodes 1011 and 1012 and MMEs 1021.

In this embodiment, the CN 1020 comprises the MMEs 1021, the S-GW 1022, the Packet Data Network (PDN) Gateway (P-GW) 1023, and a home subscriber server (HSS) 1024. The MMEs 1021 may be similar in function to the control plane of legacy Serving General Packet Radio Service (GPRS) Support Nodes (SGSN). The MMEs 1021 may manage mobility aspects in access such as gateway selection and tracking area list management. The HSS 1024 may comprise a database for network users, including subscription-related information to support the network entities' handling of communication sessions. The CN 1020 may comprise one or several HSSs 1024, depending on the number of mobile subscribers, on the capacity of the equipment, on the organization of the network, etc. For example, the HSS 1024 can provide support for routing/roaming, authentication, authorization, naming/addressing resolution, location dependencies, etc.

The S-GW 1022 may terminate the S1 interface 1013 towards the RAN 1010, and routes data packets between the RAN 1010 and the CN 1020. In addition, the S-GW 1022 may be a local mobility anchor point for inter-RAN node handovers and also may provide an anchor for inter-3GPP mobility. Other responsibilities may include lawful intercept, charging, and some policy enforcement.

The P-GW 1023 may terminate an SGi interface toward a PDN. The P-GW 1023 may route data packets between the EPC network 1023 and external networks such as a network including the application server 1030 (alternatively referred to as application function (AF)) via an Internet Protocol (IP) interface 1025. Generally, the application server 1030 may be an element offering applications that use IP bearer resources with the core network (e.g., UMTS Packet Services (PS) domain, LTE PS data services, etc.). In this embodiment, the P-GW 1023 is shown to be communicatively coupled to an application server 1030 via an IP communications interface 1025. The application server 1030 can also be configured to support one or more communication services (e.g., Voice-over-Internet Protocol (VoIP) sessions, PTT sessions, group communication sessions, social networking services, etc.) for the UEs 1001 and 1002 via the CN 1020.

The P-GW 1023 may further be a node for policy enforcement and charging data collection. Policy and Charging Enforcement Function (PCRF) 1026 is the policy and charging control element of the CN 1020. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1026 may be communicatively coupled to the application server 1030 via the P-GW 1023. The application server 1030 may signal the PCRF 1026 to indicate a new service flow and select the appropriate Quality of Service (QoS) and charging parameters. The PCRF 1026 may provision this rule into a Policy and Charging Enforcement Function (PCEF) (not shown) with the appropriate traffic flow template (TFT) and QoS class of identifier (QCI), which commences the QoS and charging as specified by the application server 1030.

Figure 11:
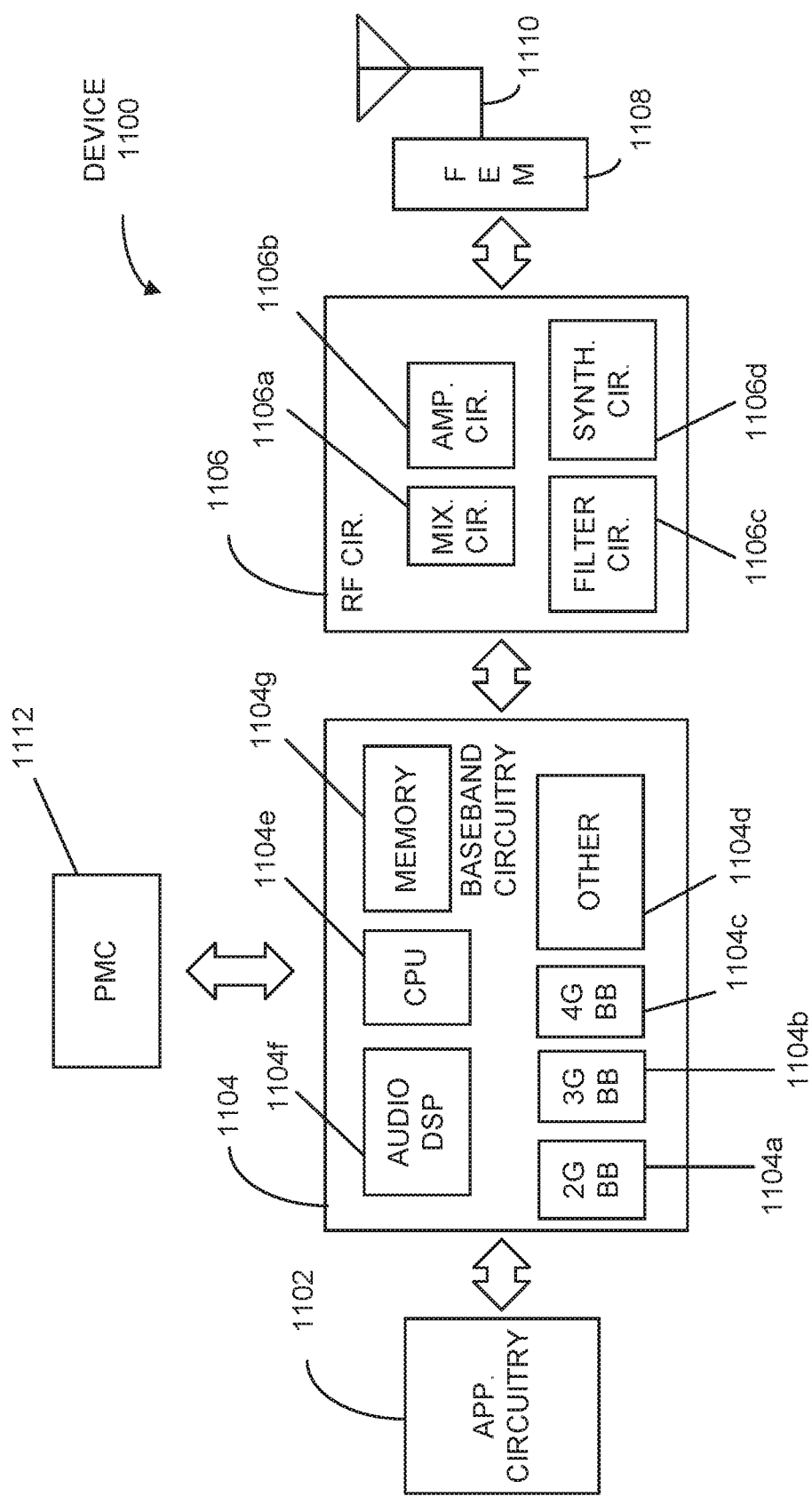
FIG. 11 illustrates a diagram of a wireless device (e.g., UE) in accordance with an example.

FIG. 11 illustrates example components of a device 1100 in accordance with some embodiments. In some embodiments, the device 1100 may include application circuitry 1102, baseband circuitry 1104, Radio Frequency (RF) circuitry 1106, front-end module (FEM) circuitry 1108, one or more antennas 1110, and power management circuitry (PMC) 1112 coupled together at least as shown. The components of the illustrated device 1100 may be included in a UE or a RAN node. In some embodiments, the device 1100 may include less elements (e.g., a RAN node may not utilize application circuitry 1102, and instead include a processor/controller to process IP data received from an EPC). In some embodiments, the device 1100 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1100. In some embodiments, processors of application circuitry 1102 may process IP data packets received from an EPC.

The baseband circuitry 1104 may include circuitry such as, but not limited to, one or more single-core or multi-core processors. The baseband circuitry 1104 may include one or more baseband processors or control logic to process baseband signals received from a receive signal path of the RF circuitry 1106 and to generate baseband signals for a transmit signal path of the RF circuitry 1106. Baseband circuitry 1104 may interface with the application circuitry 1102 for generation and processing of the baseband signals and for controlling operations of the RF circuitry 1106. For example, in some embodiments, the baseband circuitry 1104 may include a third generation (3G) baseband processor 1104a, a fourth generation (4G) baseband processor 1104b, a fifth generation (5G) baseband processor 1104c, or other baseband processor(s) 1104*d* for other existing generations, generations in development or to be developed in the future (e.g., second generation (2G), sixth generation (6G), etc.). The baseband circuitry 1104 (e.g., one or more of baseband processors 1104*a*-*d*) may handle various radio control functions that enable communication with one or more radio networks via the RF circuitry 1106. In other embodiments, some or all of the functionality of baseband processors 1104*a*-*d* may be included in modules stored in the memory 1104*g* and executed via a Central Processing Unit (CPU) 1104*e*. The radio control functions may include, but are not limited to, signal modulation/demodulation, encoding/decoding, radio frequency shifting, etc. In some embodiments, modulation/demodulation circuitry of the baseband circuitry 1104 may include Fast-Fourier Transform (FFT), precoding, or constellation mapping/demapping functionality. In some embodiments, encoding/decoding circuitry of the baseband circuitry 1104 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include one or more audio digital signal processor(s) (DSP) 1104*f*. The audio DSP(s) 1104*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1104 and the application circuitry 1102 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1104 is configured to support radio communications of more than one wireless protocol may be referred to as multi-mode baseband circuitry.

RF circuitry 1106 may enable communication with wireless networks using modulated electromagnetic radiation through a non-solid medium. In various embodiments, the RF circuitry 1106 may include switches, filters, amplifiers, etc. to facilitate the communication with the wireless network. RF circuitry 1106 may include a receive signal path which may include circuitry to down-convert RF signals received from the FEM circuitry 1108 and provide baseband signals to the baseband circuitry 1104. RF circuitry 1106 may also include a transmit signal path which may include circuitry to up-convert baseband signals provided by the baseband circuitry 1104 and provide RF output signals to the FEM circuitry 1108 for transmission.

In some embodiments, the receive signal path of the RF circuitry 1106 may include mixer circuitry 1106*a*, amplifier circuitry 1106*b* and filter circuitry 1106*c*. In some embodiments, the transmit signal path of the RF circuitry 1106 may include filter circuitry 1106*c* and mixer circuitry 1106*a*. RF circuitry 1106 may also include synthesizer circuitry 1106*d* for synthesizing a frequency for use by the mixer circuitry 1106*a* of the receive signal path and the transmit signal path.

In some embodiments, the mixer circuitry 1106*a* of the receive signal path may be configured to down-convert RF signals received from the FEM circuitry 1108 based on the synthesized frequency provided by synthesizer circuitry 1106*d*. The amplifier circuitry 1106*b* may be configured to amplify the down-converted signals and the filter circuitry 1106*c* may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a requirement. In some embodiments, mixer circuitry 1106*a* of the receive signal path may comprise passive mixers, although the scope of the embodiments is not limited in this respect.

In some embodiments, the mixer circuitry 1106*a* of the transmit signal path may be configured to up-convert input baseband signals based on the synthesized frequency provided by the synthesizer circuitry 1106*d* to generate RF output signals for the FEM circuitry 1108. The baseband signals may be provided by the baseband circuitry 1104 and may be filtered by filter circuitry 1106*c*.

In some embodiments, the mixer circuitry 1106*a* of the receive signal path and the mixer circuitry 1106*a* of the transmit signal path may include two or more mixers and may be arranged for quadrature downconversion and upconversion, respectively. In some embodiments, the mixer circuitry 1106*a* of the receive signal path and the mixer circuitry 1106*a* of the transmit signal path may include two or more mixers and may be arranged for image rejection (e.g., Hartley image rejection). In some embodiments, the mixer circuitry 1106*a* of the receive signal path and the mixer circuitry 1106*a* may be arranged for direct downconversion and direct upconversion, respectively. In some embodiments, the mixer circuitry 1106*a* of the receive signal path and the mixer circuitry 1106*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1106 may include analog-to-digital converter (ADC) and digital-to-analog converter (DAC) circuitry and the baseband circuitry 1104 may include a digital baseband interface to communicate with the RF circuitry 1106.

In some dual-mode embodiments, a separate radio IC circuitry may be provided for processing signals for each spectrum, although the scope of the embodiments is not limited in this respect.

In some embodiments, the synthesizer circuitry 1106*d* may be a fractional-N synthesizer or a fractional N/N+1 synthesizer, although the scope of the embodiments is not limited in this respect as other types of frequency synthesizers may be suitable. For example, synthesizer circuitry 1106*d* may be a delta-sigma synthesizer, a frequency multiplier, or a synthesizer comprising a phase-locked loop with a frequency divider.

The synthesizer circuitry 1106*d* may be configured to synthesize an output frequency for use by the mixer circuitry 1106*a* of the RF circuitry 1106 based on a frequency input and a divider control input. In some embodiments, the synthesizer circuitry 1106*d* may be a fractional N/N+1 synthesizer.

In some embodiments, frequency input may be provided by a voltage controlled oscillator (VCO), although that is not a requirement. Divider control input may be provided by either the baseband circuitry 1104 or the application circuitry 1102 depending on the desired output frequency. In some embodiments, a divider control input (e.g., N) may be determined from a look-up table based on a channel indicated by the application circuitry 1102.

Synthesizer circuitry 1106*d* of the RF circuitry 1106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1106*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1106 may include an IQ/polar converter.

FEM circuitry 1108 may include a receive signal path which may include circuitry configured to operate on RF signals received from one or more antennas 1110, amplify the received signals and provide the amplified versions of the received signals to the RF circuitry 1106 for further processing. FEM circuitry 1108 may also include a transmit signal path which may include circuitry configured to amplify signals for transmission provided by the RF circuitry 1106 for transmission by one or more of the one or more antennas 1110. In various embodiments, the amplification through the transmit or receive signal paths may be done solely in the RF circuitry 1106, solely in the FEM 1108, or in both the RF circuitry 1106 and the FEM 1108.

In some embodiments, the FEM circuitry 1108 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1106). The transmit signal path of the FEM circuitry 1108 may include a power amplifier (PA) to amplify input RF signals (e.g., provided by RF circuitry 1106), and one or more filters to generate RF signals for subsequent transmission (e.g., by one or more of the one or more antennas 1110).

In some embodiments, the PMC 1112 may manage power provided to the baseband circuitry 1104. In particular, the PMC 1112 may control power-source selection, voltage scaling, battery charging, or DC-to-DC conversion. The PMC 1112 may often be included when the device 1100 is capable of being powered by a battery, for example, when the device is included in a UE. The PMC 1112 may increase the power conversion efficiency while providing desirable implementation size and heat dissipation characteristics.

While FIG. 11 shows the PMC 1112 coupled only with the baseband circuitry 1104. However, in other embodiments, the PMC 11 12 may be additionally or alternatively coupled with, and perform similar power management operations for, other components such as, but not limited to, application circuitry 1102, RF circuitry 1106, or FEM 1108.

In some embodiments, the PMC 1112 may control, or otherwise be part of, various power saving mechanisms of the device 1100. For example, if the device 1100 is in an RRC_Connected state, where it is still connected to the RAN node as it expects to receive traffic shortly, then it may enter a state known as Discontinuous Reception Mode (DRX) after a period of inactivity. During this state, the device 1100 may power down for brief intervals of time and thus save power.

If there is no data traffic activity for an extended period of time, then the device 1100 may transition off to an RRC_Idle state, where it disconnects from the network and does not perform operations such as channel quality feedback, handover, etc. The device 1100 goes into a very low power state and it performs paging where again it periodically wakes up to listen to the network and then powers down again. The device 1100 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1102 and processors of the baseband circuitry 1104 may be used to execute elements of one or more instances of a protocol stack. For example, processors of the baseband circuitry 1104, alone or in combination, may be used execute Layer 3, Layer 2, or Layer 1 functionality, while processors of the application circuitry 1104 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 12:
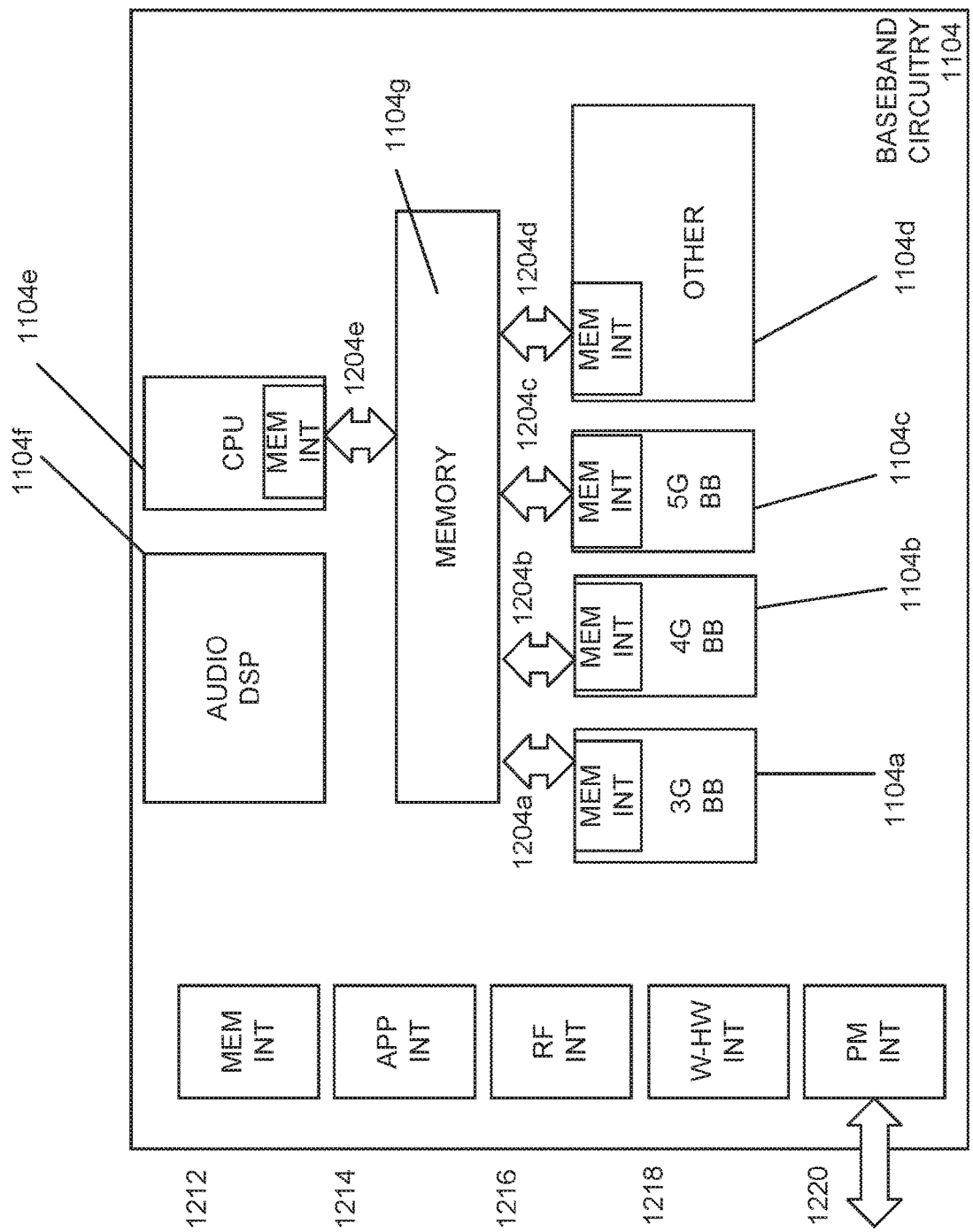
FIG. 12 illustrates interfaces of baseband circuitry in accordance with an example.

FIG. 12 illustrates example interfaces of baseband circuitry in accordance with some embodiments. As discussed above, the baseband circuitry 1104 of FIG. 11 may comprise processors 1104*a*-1104*e* and a memory 1104*g* utilized by said processors. Each of the processors 1104*a*-1104*e* may include a memory interface, 1204*a*-1204*e*, respectively, to send/receive data to/from the memory 1104*g*.

The baseband circuitry 1104 may further include one or more interfaces to communicatively couple to other circuitries/devices, such as a memory interface 1212 (e.g., an interface to send/receive data to/from memory external to the baseband circuitry 1104), an application circuitry interface 1214 (e.g., an interface to send/receive data to/from the application circuitry 1102 of FIG. 11), an RF circuitry interface 1216 (e.g., an interface to send/receive data to/from RF circuitry 1106 of FIG. 11), a wireless hardware connectivity interface 1218 (e.g., an interface to send/receive data to/from Near Field Communication (NFC) components, Bluetooth® components (e.g., Bluetooth® Low Energy), Wi-Fi® components, and other communication components), and a power management interface 1220 (e.g., an interface to send/receive power or control signals to/from the PMC 1112.

Figure 13:
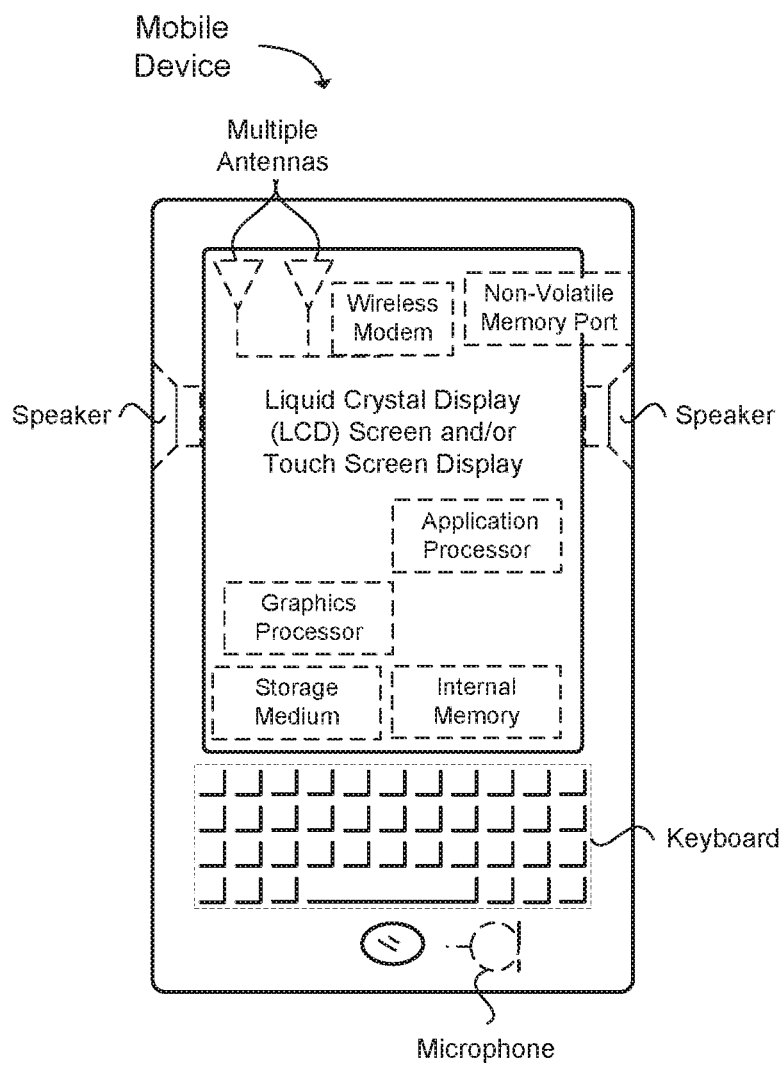
FIG. 13 illustrates a diagram of a wireless device (e.g., UE) in accordance with an example.

FIG. 13 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 13 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Examples

The following examples pertain to specific technology embodiments and point out specific features, elements, or actions that can be used or otherwise combined in achieving such embodiments.

Example 1 includes an apparatus of an eNodeB operable to decode a sounding reference signal (SRS) received from a user equipment (UE), the apparatus comprising: one or more processors configured to: decode, at the eNodeB, the SRS received from the UE, wherein the SRS is received using one or more SRS resources in a subframe where each SRS resource includes one or more symbols, wherein the subframe is an uplink subframe dedicated for SRS transmission or a short transmission time interval (sTTI) subframe used for SRS transmission; and determine, at the eNodeB, uplink channel quality information for a channel between the eNodeB and the UE based in part on the SRS; and a memory interface configured to send to a memory the uplink channel quality information.

Example 2 includes the apparatus of Example 1, further comprising a transceiver configured to receive the SRS from the UE.

Example 3 includes the apparatus of any of Examples 1 to 2, wherein the one or more processors are configured to configure the UE with one or more aperiodic, periodic or semi-persistent SRS resources.

Example 4 includes the apparatus of any of Examples 1 to 3, wherein the one or more symbols associated with the SRS resource enable repetition of a SRS transmission from the UE.

Example 5 includes the apparatus of any of Examples 1 to 4, wherein the SRS resource consists of N adjacent symbols in a slot, wherein N is one of 1, 2, 4, 6, or 7.

Example 6 includes the apparatus of any of Examples 1 to 5, wherein the one or more processors are configured encode a higher layer parameter R for transmission to the UE, wherein R represents a repetition factor used for the SRS resource, wherein R is one of 1, 2, 4, 6, or 7, and R is less than or equal to N.

Example 7 includes the apparatus of any of Examples 1 to 6, wherein the SRS is transmitted from the UE with frequency hopping and the higher layer parameter R representing the repetition factor, wherein an SRS repetition is performed over a same set of subcarriers and an SRS frequency hopping is performed every R transmission occasions of the SRS.

Example 8 includes the apparatus of any of Examples 1 to 7, wherein the SRS is transmitted from the UE with an SRS group or using sequence hopping, wherein each SRS group or SRS sequence depends on one or more single carrier frequency division multiple access (SC-FDMA) symbols of the subframe.

Example 9 includes the apparatus of any of Examples 1 to 8, wherein a physical uplink control channel (PUCCH) is multiplexed with the uplink subframe dedicated for SRS transmission at one or more edges of a system bandwidth of the subframe.

Example 10 includes the apparatus of any of Examples 1 to 9, wherein an unused symbol within a sub-slot in the sTTI subframe containing the SRS resource is muted except when the unused symbol is a last symbol of the sTTI subframe.

Example 11 includes the apparatus of any of Examples 1 to 10, wherein all symbols in the uplink subframe dedicated for SRS transmission are used for SRS transmission.

Example 12 includes the apparatus of any of Examples 1 to 11, wherein a subset of sub-slots of the sTTI subframe are used for SRS transmission and remaining subsets of sub-slots of the sTTI subframe are used for data or control channels transmission.

Example 13 includes the apparatus of any of Examples 1 to 12, wherein the uplink subframe dedicated for SRS transmission and the sTTI subframe are not special subframes.

Example 14 includes the apparatus of any of Examples 1 to 13, wherein the uplink subframe dedicated for SRS transmission is one of a time division duplex (TDD) subframe or a frequency division duplex (FDD) subframe.

Example 15 includes an apparatus of a user equipment (UE) operable to encode a sounding reference signal (SRS) for transmission to an eNodeB, the apparatus comprising: one or more processors configured to: encode, at the UE, the SRS for transmission to the eNodeB, wherein the SRS is transmitted using one or more SRS resources in a subframe where each SRS resource includes one or more symbols, wherein the subframe is an uplink subframe dedicated for SRS transmission or a short transmission time interval (sTTI) subframe used for SRS transmission; and a memory interface configured to retrieve from a memory the SRS.

Example 16 includes the apparatus of Example 15, wherein the SRS resource consists of N adjacent symbols in a slot, wherein N is one of 1, 2, 4, 6, or 7.

Example 17 includes the apparatus of any of Examples 15 to 16, wherein the SRS is transmitted from the UE with frequency hopping and the higher layer parameter R representing the repetition factor, wherein an SRS repetition is performed over a same set of subcarriers and an SRS frequency hopping is performed every R transmission occasions of the SRS.

Example 18 includes the apparatus of any of Examples 15 to 17, wherein the SRS is transmitted from the UE with an SRS group or using sequence hopping, wherein each SRS group or SRS sequence depends on one or more single carrier frequency division multiple access (SC-FDMA) symbols of the subframe.

Example 19 includes the apparatus of any of Examples 15 to 18, wherein: all symbols in the uplink subframe dedicated for SRS transmission are used for SRS transmission; or a subset of sub-slots of the sTTI subframe are used for SRS transmission and remaining subsets of sub-slots of the sTTI subframe are used for data transmission.

Example 20 includes the apparatus of any of Examples 15 to 19, wherein the uplink subframe dedicated for SRS transmission and the sTTI subframe are not special subframes.

Example 21 includes at least one machine readable storage medium having instructions embodied thereon for decoding a sounding reference signal (SRS) received from a user equipment (UE), the instructions when executed by one or more processors at an eNodeB perform the following: decoding, at the eNodeB, the SRS received from the UE, wherein the SRS is received using one or more SRS resources in a subframe where each SRS resource includes one or more symbols, wherein the subframe is an uplink subframe dedicated for SRS transmission or a short transmission time interval (sTTI) subframe used for SRS transmission; and determining, at the eNodeB, uplink channel quality information for a channel between the eNodeB and the UE based in part on the SRS.

Example 22 includes the at least one machine readable storage medium of Example 21, wherein the SRS resource consists of N adjacent symbols in a slot, wherein N is one of 1, 2, 4, 6, or 7.

Example 23 includes the at least one machine readable storage medium of any of Examples 21 to 22, further comprising instructions when executed perform the following: encoding a higher layer parameter R for transmission to the UE, wherein R represents a repetition factor used for the SRS resource, wherein R is one of 1, 2, 4, 6, or 7, and R is less than or equal to N.

Example 24 includes the at least one machine readable storage medium of any of Examples 21 to 23, wherein a physical uplink control channel (PUCCH) is multiplexed with the uplink subframe dedicated for SRS transmission at one or more edges of a system bandwidth of the subframe.

Example 25 includes the at least one machine readable storage medium of any of Examples 21 to 24, wherein the uplink subframe dedicated for SRS transmission and the sTTI subframe are not special subframes.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:

1. An apparatus of a base station operable to decode a sounding reference signal (SRS) received from a user equipment (UE), the apparatus comprising:
one or more processors configured to:
decode, at the base station, the SRS received from the UE, wherein the SRS is received using one or more SRS resources in a subframe where an SRS resource of the one or more resources includes one or more symbols, wherein the subframe is an uplink subframe dedicated for SRS transmission, wherein a physical uplink control channel (PUCCH) is multiplexed with the uplink subframe dedicated for SRS transmission at one or more edges of a frequency domain system bandwidth of the subframe; and
determine, at the base station, uplink channel quality information for a channel between the base station and the UE based in part on the SRS; and
a memory interface configured to send to a memory the uplink channel quality information.

2. The apparatus of claim 1, wherein the one or more symbols of the SRS resource comprises a plurality of symbols, and wherein a transmission of the SRS is repeated within the plurality of symbols of the SRS resource.

3. The apparatus of claim 1, wherein the SRS resource consists of N adjacent symbols in a slot, wherein N is one of 1, 2, 4, 6, or 7.

4. The apparatus of claim 3, wherein the one or more processors are configured encode a higher layer parameter R for transmission to the UE, wherein R represents a repetition factor used for the SRS resource, wherein R is one of 1, 2, 4, 6, or 7, and R is less than or equal to N, and wherein the SRS is transmitted from the UE with frequency hopping and the higher layer parameter R representing the repetition factor, wherein an SRS repetition is performed over a same set of subcarriers and an SRS frequency hopping is performed every R transmission occasions of the SRS.

5. The apparatus of claim 1, wherein the SRS is transmitted from the UE with an SRS group or using sequence hopping, wherein each SRS group or SRS sequence depends on one or more single carrier frequency division multiple access (SC-FDMA) symbols of the subframe.

6. The apparatus of claim 1, wherein the uplink subframe dedicated for SRS transmission is not a special subframe.

7. The apparatus of claim 1, wherein the uplink subframe dedicated for SRS transmission is one of a time division duplex (TDD) subframe or a frequency division duplex (FDD) subframe.

8. An apparatus of a user equipment (UE) operable to encode a sounding reference signal (SRS) for transmission to a base station, the apparatus comprising:
one or more processors configured to:
encode, at the UE, the SRS for transmission to the base station, wherein the SRS is transmitted using one or more SRS resources in a subframe where an SRS resource includes one or more symbols, wherein the subframe is an uplink subframe dedicated for SRS transmission, wherein a physical uplink control channel (PUCCH) is multiplexed with the uplink subframe dedicated for SRS transmission at one or more edges of a frequency domain_system bandwidth of the subframe; and
a memory interface configured to retrieve from a memory the SRS.

9. The apparatus of claim 8, wherein the SRS resource consists of N adjacent symbols in a slot, wherein N is one of 1, 2, 4, 6, or 7.

10. The apparatus of claim 9, wherein the SRS is transmitted from the UE with frequency hopping and the higher layer parameter R representing the repetition factor, wherein an SRS repetition is performed over a same set of subcarriers and an SRS frequency hopping is performed every R transmission occasions of the SRS.

11. The apparatus of claim 8, wherein the SRS is transmitted from the UE with an SRS group or using sequence hopping, wherein each SRS group or SRS sequence depends on one or more single carrier frequency division multiple access (SC-FDMA) symbols of the subframe.

12. The apparatus of claim 8, wherein the uplink subframe dedicated for SRS transmission is not a special subframe.

13. At least one non-transitory machine readable storage medium having instructions embodied thereon for decoding a sounding reference signal (SRS) received from a user equipment (UE), the instructions when executed by one or more processors at a base station perform the following:

decoding, at the base station, the SRS received from the UE, wherein the SRS is received using one or more SRS resources in a subframe where an SRS resource includes one or more symbols, wherein the subframe is an uplink subframe dedicated for SRS transmission, wherein a physical uplink control channel (PUCCH) is multiplexed with the uplink subframe dedicated for SRS transmission at one or more edges of a frequency domain system bandwidth of the subframe; and determining, at the base station, uplink channel quality information for a channel between the base station and the UE based in part on the SRS.

14. The at least one non-transitory machine readable storage medium of claim 13, wherein the SRS resource consists of N adjacent symbols in a slot, wherein N is one of 1, 2, 4, 6, or 7.

15. The at least one non-transitory machine readable storage medium of claim 14, further comprising instructions when executed perform the following: encoding a higher layer parameter R for transmission to the UE, wherein R represents a repetition factor used for the SRS resource, wherein R is one of 1, 2, 4, 6, or 7, and R is less than or equal to N.

16. The at least one non-transitory machine readable storage medium of claim 13, wherein the uplink subframe dedicated for SRS transmission is not a special subframe.

\* \* \* \* \*